United States Patent
McClain et al.

[15] 3,685,035
[45] Aug. 15, 1972

[54] FAULT INDICATING APPARATUS

[72] Inventors: James E. McClain; Arcus F. Parks; Howard L. Scott, all of Greenville, Tex.

[73] Assignee: Esco Manufacturing Company, Greenville, Tex.

[22] Filed: Aug. 26, 1971

[21] Appl. No.: 175,116

[52] U.S. Cl. ............... 340/253 A, 317/22, 317/33 C, 317/33 SC, 317/151
[51] Int. Cl. ............................................. G08b 21/00
[58] Field of Search ......... 340/253 A, 253 N, 253 C, 253 Q; 317/22, 33 SC, 33 C, 151

[56] References Cited

UNITED STATES PATENTS

| | | | |
|---|---|---|---|
| 3,366,848 | 1/1968 | Luehring et al. | 317/22 X |
| 3,418,529 | 12/1968 | Attewell | 317/22 X |

*Primary Examiner*—James D. Trammell
*Attorney*—Kenneth R. Glaser et al.

[57] ABSTRACT

Disclosed is fault indicating apparatus responsive to normal and excessive current associated with an external circuit conductor being monitored, the fault indicating apparatus including an indicator for providing a visual indication of the normal or fault current condition in the external circuit conductor, a fault responsive network portion for selectively switching current through a fault winding associated with the indicator during excessive current flow, a reset network portion for selectively providing current pulses through a reset winding associated with the indicator during normal current flow, the reset network including a relaxation oscillator for periodically triggering a transistor switch into conduction for providing the current pulses to the reset coil, a diode-capacitor network operatively responsive to the excessive current through the monitored conductor for controllably disabling the relaxation oscillator during the fault cycle, the fault indicator apparatus automatically providing a visual indication of the normal or fault condition of the monitored conductor.

9 Claims, 1 Drawing Figure

PATENTED AUG 15 1972　　　3,685,035
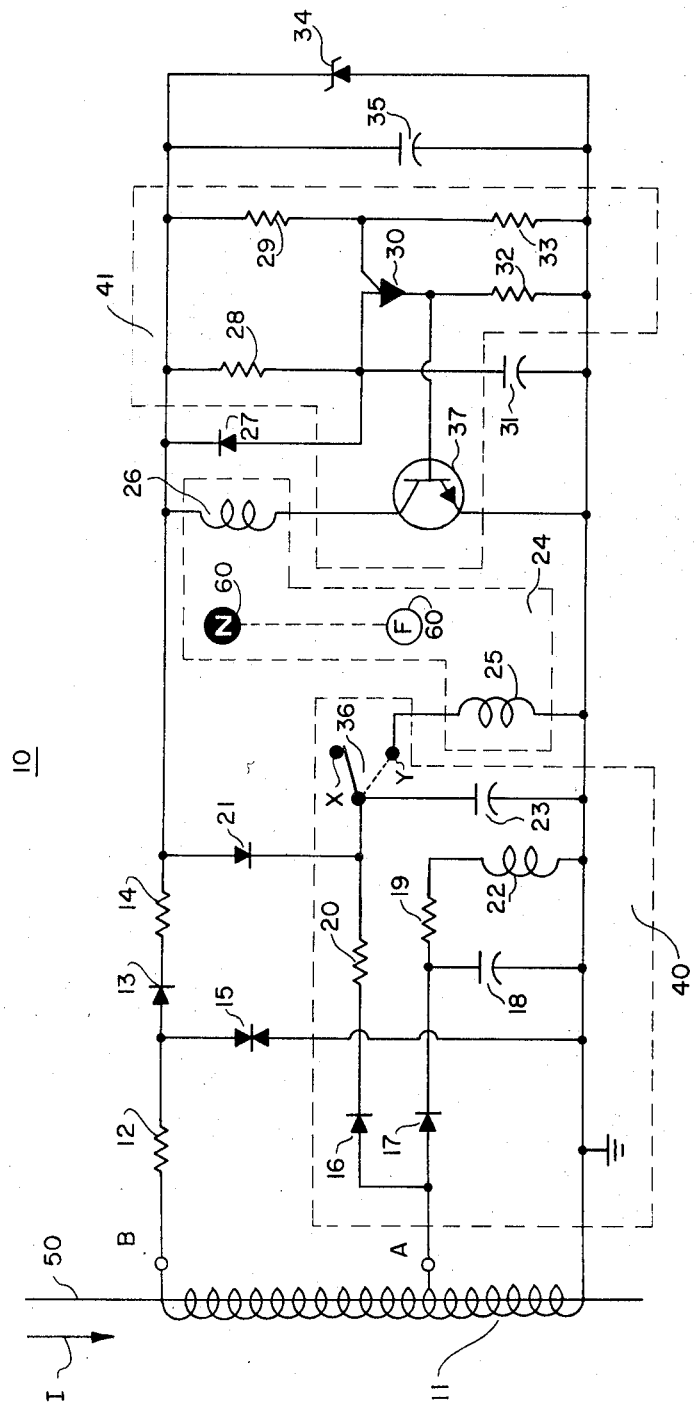

FAULT INDICATING APPARATUS

The present invention relates to electrical condition responsive apparatus, more particularly to over-current detectors and indicators, and even more particularly to fault indicator apparatus automatically responsive to normal and fault currents through a coupled power distribution system.

Electrical power distribution systems often involve complex and extensive feed networks for supplying the requisite power to many diverse loads. With the increased complexity of these systems, there is a corresponding increase in difficulty of detecting and locating faults which may occur at various locations in the networks. Due to the appreciable time and expense required in monitoring the entire power distribution system in order to detect and isolate these faults, it has become necessary to install fault indicator networks at various locations throughout the power distribution system for quickly and effectively conveying information pertaining to the location of the faults.

Previous designs of these fault indicating networks, however, have not produced entirely satisfactory results. For example, many such indicators, although automatically responsive to a fault indication within the monitored network require manual resetting of the indicator after network, of the fault and restoration of the network to the normal operating condition. Additionally, many of these indicators are intricate, expensive devices which are not entirely reliable in their operation.

It is therefore a primary object of the invention to provide a new and improved fault indicator apparatus for monitoring and detecting excessive current conditions within the network being monitored.

It is a further object of the invention to provide fault indicator apparatus which not only automatically responds to and indicates the presence of fault currents within the monitored network, but also automatically resets itself upon correction of the fault condition.

It is an even further object of the invention to provide an improved fault indicator apparatus which is inexpensive to manufacture and is reliable during operation.

In accordance with these and other objects, the present invention is directed to fault indicating apparatus of the type adapted to be coupled to, and responsive to current flow within, a conductor of an external network being monitored. The improved apparatus of the invention includes indicating means responsively switchable between a first indicating condition representative of normal current flow within the monitored conductor and a second indicating condition representative of excessive current flow within said conductor. A reset network portion provides periodic current pulses to a reset coil associated with the indicating means for maintaining the indicator in the "normal" indicating condition during normal current flow through the conductor; and a fault responsive network portion selectively directs current through a fault coil associated with the indicating means in response to excessive current through the conductor while at the same time disabling the reset network portion, thereby to automatically switch the indicator into the fault indicating condition. Upon correction of the fault, and restoration of normal current flow through the monitored conductor, the apparatus automatically resets itself to the "normal" indicating condition.

Other objects and many of the attendant advantages of the invention, as well as specific features thereof, will be readily appreciated by those of ordinary skill in the art as the same become better understood by reference to the following detailed description taken in conjunction with the accompanying drawing in which:

The sole FIGURE of the drawing is a schematic illustration of a preferred embodiment of the fault indicator apparatus of the present invention.

Referring now to the sole FIGURE of the drawing, there is depicted the fault indicating apparatus 10 in accordance with the present invention. Accordingly, the apparatus 10 is operatively coupled to a conductor 50 of an external electrical network (not shown) for monitoring the current I therein; the apparatus 10 including an indicator portion 24 for indicating the presence of either a "normal" or "fault" current condition within the conductor 50 and fault responsive and reset network portions 40 and 41 for respectively switching the indicator 24 between the "fault" and "normal" indicating positions.

Consistent with principles of the present invention, the indicating means 24 can be of any type presently known in the art which is responsively switchable between first and second indicating conditions, and the indicating conditions may be represented visually, as by way of a series of lights, flags, etc.; audibly, as by way of a buzzer; or any other similar type of indication which can represent and convey information indicative of the normal or excessive state of the current flow through the conductor 50. In accordance with a preferred embodiment, however, the indicator 24 is a magnetically polarized latching status indicator of the type manufactured and distributed by Ferranti-Packard Electric Limited of Toronto, Canada, which status indicator comprises a pair of windings or coils 25 and 26 and a disc 60, the disc 60 being translated between an "N" indication (representing "normal" current through conductor 50) and an "F" indication (representing "fault" current therethrough) as a consequence of current flow respectively through either the reset coil 26 or the fault coil 25. Current flow through these respective coils is effected as a consequence of the actuation or deactuation of the fault and reset networks 40 and 41, all as subsequently described.

Coupling of the fault indicating apparatus 10 to the external network being monitored is accomplished, for example, by disposing a conventional sensing transformer winding 11 around the conductor 50 of the external network, the output signals at the terminals A and B thereof thereby being proportional to the magnitude of the current flow through the conductor 50. The output signal from the terminal A, which is lower in magnitude than the output signal from the terminal B, is coupled to the fault network 40, while the output signal from the terminal B is coupled to the reset network 41 by way of resistors 12 and 14 and rectifier diode 13, as illustrated in the drawing.

In accordance with a specific feature of the present invention, reset network 41 for supplying actuating current to the reset coil 26 comprises a relaxation oscillator (constituting a programmable unijunction transistor 30, resistors 28, 29, 32, and 33, and capacitor 31) and transistor switch 37. The relaxation oscillator is of the type which generates substantially a sawtooth output at a frequency rate established by the resistor 28 and capacitor 31, the resistors 29 and 33 establishing the bias for transistor 30. The pulsed output of the oscillator (which is the output from the unijunction transistor 30) is applied to the base of the transistor switch 37, which conduction occurs in response to the receipt of these pulses. Resistor 14, diodes 13 and 24, and capacitor 35 provide voltage regulation for the reset network 41.

The fault control network 40, which is coupled intermediate the terminal A and the fault winding 25, selectively provides current to the fault winding 25, as subsequently described; and comprises a relay coil 22 for responsively moving switch 36 from the open or "X" position shown to the closed or "Y" position; a capacitor 23 for discharging the energy from the coil 25 when the switch 36 is in the closed position; rectifying diode 16 and resistor 20 providing a charging path for the capacitor 23; and rectifying diode 17, resistor 19, and filter capacitor 18 associated with the relay coil 22.

Also included in apparatus 10 are a pair of diodes 27 and 21 providing, upon conduction, a discharge path for the capacitor 31 (and capacitor 35), the discharging of which disables the unijunction transistor 30 during the "fault" cycle; and a transient voltage suppressor 15 which, in combination with the resistor 12, provides a protective network for the indicator 24 by limiting the voltage supplied thereto.

In accordance with the operation of the apparatus 10, initially assume that the current I through the conductor 50 is at its normal operating level. As a consequence, the output signal from terminal A is below the actuating level for the fault network, the normally-open relay switch 36 is in the "X" position, and no excitation current is provided to the fault coil 25. At the same time, the relaxation oscillator of network 41 generates periodic pulses at the output of the transistor 30 which, in turn, results in the periodic conduction and nonconduction of the transistor switch 37, thus providing periodic current pulses to the reset coil 26. These periodic current pulses are thereby effective to maintain the indicator 24 in such a polarized condition that the disc 60 is in the "N" or normal indicating position.

Upon the occurrence of a fault or overload condition in the external network, thus resulting in excessive current flow within the conductor 50 above the normal operating level, the voltage output at the terminal A of the transformer 11 increases to a level which causes increased current to flow through the relay coil 22 which, in turn, moves relay switch 36 associated therewith to the closed or "Y" position, exciting current consequently being supplied to the fault winding 25. Simultaneously, and as a consequence thereof, diodes 21 and 27 are so biased to conduct and provide a discharge path for the capacitor 31 (and capacitor 35) through the fault winding 25, the previously stored energy in the capacitor 23 also being discharged through the fault winding 25. As a consequence of the discharging of capacitor 31, the unijunction transistor 30 is effectively disabled, and current pulses provided to the coil 26 cease, thus effectively isolating the network 41 from the indicator 24. As a result of this just described operation, the fault coil 25 has been energized, the reset coil 26 has been de-energized, and the indicating device 24 is so polarized to translate the disc 60 to its "F" or fault indicating condition.

Upon correction of the fault or overload condition in the conductor 50, the consequent drop in voltage at terminals A and B of the transformer coil 11 results in the switch 36 being restored to its normally-open position, a restoration of the charge on the capacitor 31, and the consequent de-energization and energization, respectively, of the coils 25 and 26. Thus, after a short time delay (normally less than 30 seconds) the indicator 24 is automatically restored to its "N" or normal indicating condition without the need for manually resetting the indicator disc 60.

It is thus observed that the fault indicator apparatus 10 of the present invention provides a system which automatically responds to and indicates the occurrence of an overload or excessive current condition in the external network being monitored as well as automatically resetting the indicator to the normal operating indicating condition upon correction of the fault or overload condition. Various types and values of circuit components may be utilized in the network 10 to effect the previously described operation. In accordance with one specific construction of the apparatus that has been built and tested, however, the following circuit components were advantageously utilized:

| | |
|---|---|
| Resistors 12 and 19 | 1K ohms |
| Resistor 14 | 27K ohms |
| Resistor 20 | 470 ohms |
| Resistor 28 | 820K ohms |
| Resistor 32 | 4.7K ohms |
| Resistor 29 | 51K ohms |
| Resistor 33 | 82K ohms |
| Capacitors 18 and 31 | 10 mfd. |
| Capacitors 23 and 35 | 100 mfd. |
| Diode 16 | 1N4006 |
| Diodes 13, 17, 21 and 27 | 1N4003 |
| Zener diode 34 | 1N753 |
| Voltage suppressor 15 | 6RS20SP16B16 (General Electric) |
| Programmable unijunction transistor 30 | D13T1 (General Electric) |
| Transistor 37 | 2N3704 |

Various changes, modifications, and substitutions to the disclosed preferred embodiment of the invention, as well as alternate embodiments thereof, may become apparent to one ordinarily skilled in the art without departing from the spirit and scope of the invention as defined by the appended claims.

What is claimed is:

1. Fault indicating apparatus of the type responsive to current flow in excess of a normal predetermined value, said apparatus comprising:
    a. indicating means responsively switchable between a first indicating condition representative of said normal current flow and a second indicating condition representative of said excessive current flow,
    b. first means operatively coupled to said indicating means for maintaining said indicating means in said first indicating condition,
    c. second means, when actuated, switching said indicating means to said second indicating condition, and
    d. third means proportional to said current flow for actuating said second means and disabling said first means from operative coupling to said indicating means in response to said excessive current flow, thereby to switch said indicating means to said second indicating condition; and for de-actuating said second means and coupling said first means to said indicating means when said normal current flow reoccurs, thereby to switch said indicating means to said first indicating condition.

2. The apparatus as described in claim 1 wherein said indicating means includes a pair of windings, current flow through respective ones of said windings selectively switching said indicating means between said first and second conditions.

3. The apparatus as described in claim 2 wherein said first means comprises pulse generating means for periodically providing current through one of the said windings and said third means is responsive to said excessive current flow to prevent said pulses from reaching said one winding.

4. The apparatus as described in claim 3 wherein said pulse generating means comprises a relaxation oscillator having its output coupled to the input of a transistor switch, the output of the transistor switch being coupled to the said one winding.

5. The apparatus as described in claim 4 further including capacitor means coupled to said relaxation oscillator, said capacitor means being discharged in response to said excessive current flow to disable said relaxation oscillator.

6. Electrical condition responsive apparatus of the type responsive to current flow through an electrical network, said apparatus comprising:
   a. sensing transformer means coupled to said electrical network for producing a pair of output signals proportional to the magnitude of current flow through said electrical network;
   b. visual indicating means responsively switchable between a first visual indication representative of normal current flow through said electrical network and a second visual indication representative of excessive current flow through said electrical network, said visual indicating means comprising a pair of windings, current flow through respective ones of said windings selectively switching said indicating means between said first and second indications;
   c. a first network portion coupled to said sensing transformer means for providing periodic current pulses to one of said windings, thereby to maintain said indicating means at said first indication;
   d. a second network portion coupled to said sensing transformer means for selectively providing current flow through the other of said windings to switch said indicating means to said second indication; and
   e. third network means coupled to said first and second network portions for disabling said second network means in response to said excessive current flow to prevent said current pulses from reaching said on winding.

7. The apparatus as defined in claim 6 wherein said first network portion comprises a relaxation oscillator and a transistor switch, the output of said relaxation oscillator being coupled to the input of said transistor switch, the output of said transistor switch being coupled to said one winding.

8. The apparatus as defined in claim 7 wherein said third network means comprises a capacitor coupled to said relaxation oscillator, and diode means coupling said capacitor to said other winding, the conduction of said diode in response to said excessive current flow, effective to discharge said capacitor through said other winding, thereby to disable said relaxation oscillator.

9. The apparatus as defined in claim 8 wherein said first network portion comprises a relay actuated in response to said excessive current flow.

* * * * *